Nov. 26, 1957 W. J. SCHUPNER 2,814,238
PORTABLE BROACH PULLING MACHINE
Filed Nov. 26, 1954 2 Sheets-Sheet 1
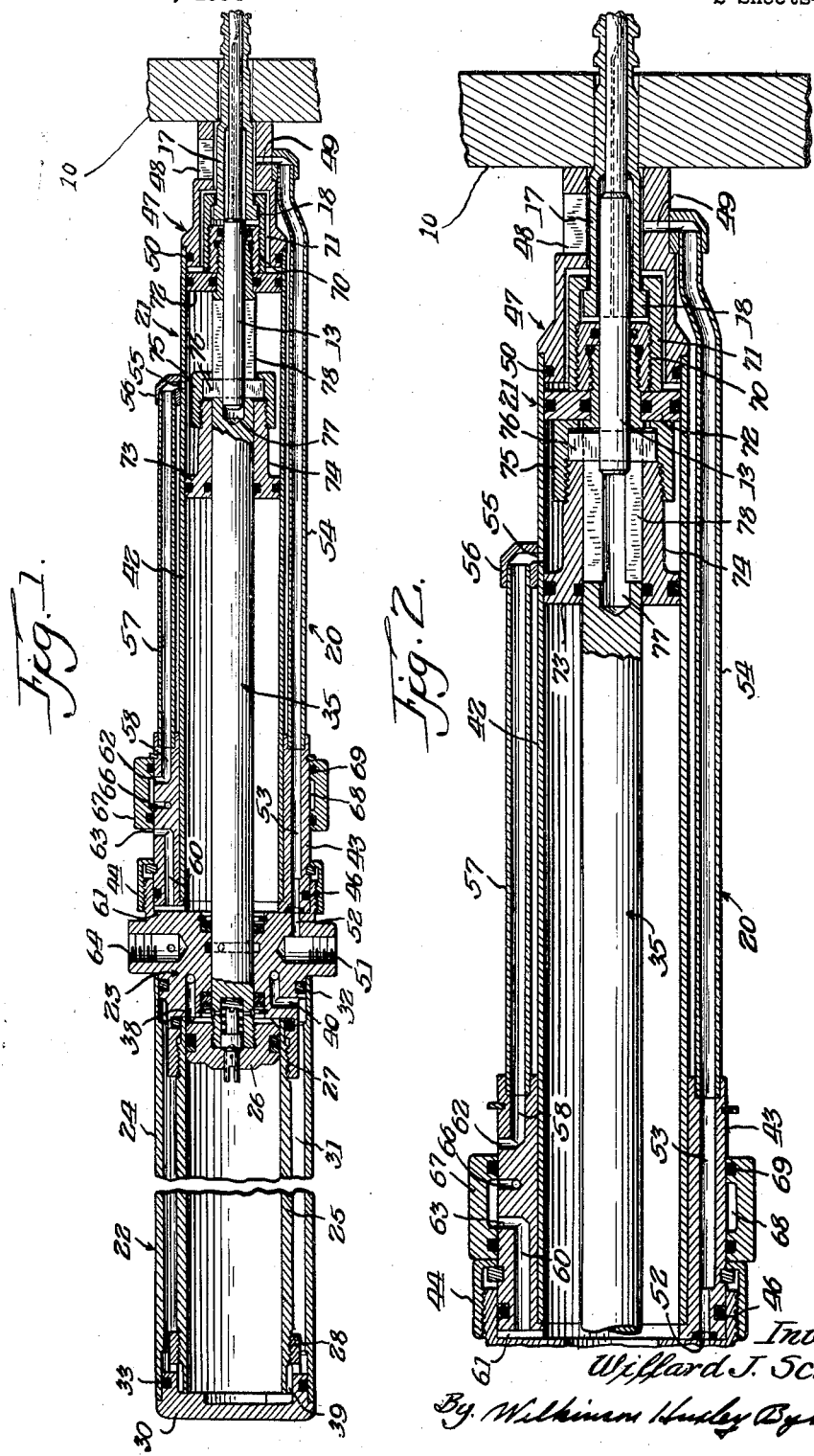
Inventor.
Willard J. Schupner.
By Wilkinson Huxley Byron & Hume
Attys.

Nov. 26, 1957

W. J. SCHUPNER 2,814,238

PORTABLE BROACH PULLING MACHINE

Filed Nov. 26, 1954

Inventor:
Willard J. Schupner
By Wilkinson Huxley Byron & Hume
Attys.

United States Patent Office 2,814,238

Patented Nov. 26, 1957

2,814,238

PORTABLE BROACH PULLING MACHINE

Willard J. Schupner, Evanston, Ill., assignor to Hanna Engineering Works, Chicago, Ill., a corporation of Illinois Application November 26, 1954, Serial No. 471,430

5 Claims. (Cl. 90—33)

The invention relates to the art of broaching small holes in metal plate and has reference particularly to a broach pulling machine incorporating improved and novel structure for expanding and contracting an expansible type of broach, the said structure additionally operating in conjunction with a power cylinder for reciprocating the broach, whereby the broach in contracted condition can be inserted in the hole, expanded and then withdrawn through the hole for broaching the same, both operations being effected from the same side of the metal plate.

In order to broach a hole in a metal plate, for example, the said hole must first be drilled to a diameter several thousandths of an inch less than the finished diameter. The drilled diameter of the hole is just slightly larger than that of the pulling end or shank end of the broach, and in conventional practice the said shank end is inserted in the hole and positioned so that the cutting teeth are located on one side with the shank end projecting from the other side of the metal plate. The shank end is engaged by a broach pulling machine and upon operation of the same the cutting teeth are drawn through the hole to thereby perform the broaching operation. Since the present broaching machine is designed for use with an expanding type of broach, it will be understood that both operations of inserting and drawing the broach through the hole can be performed from the same side of the metal plate. This constitutes the major advantage of an expanding type of broach.

In view of the foregoing, it is an object of the present invention to provide a broach pulling machine embodying improved structure rendering the same especially adapted for use with an expanding type of broach.

Another object of the present invention is to provide a machine for broaching holes in metal plate and which will incorporate novel structure for use with an expanding type of broach, the said novel structure having operation to effect expansion and contraction of the broach whereby all operations for broaching can be performed from the same side of the hole.

A more specific object of the invention is to provide a broach pulling machine essentially consisting of a power cylinder having a forwardly extending piston rod with auxiliary piston structure carried by said piston rod for effecting expansion and contraction of the broach independently of bodily reciprocating movements imparted thereto by operations of the power cylinder.

Another object of the invention is to provide an improved machine of the character described wherein the power cylinder may be operated by an hydraulic fluid under pressure and wherein the auxiliary piston structure may be operated by air under pressure.

Another object is to provide a broach pulling machine for the purposes described which will incorporate an air jet for dislodging and ejecting metal particles accumulating at the forward end of the machine and which would otherwise interfere with its efficient operation.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is a longitudinal sectional view of the broaching machine of the invention showing the piston and piston rod of the power cylinder in forward position and showing the auxiliary piston structure in retracted position;

Figure 2 is a fragmentary longitudinal sectional view of the present broaching machine showing the position of certain parts following operation of the auxiliary piston structure for expanding the broach;

Figure 3:
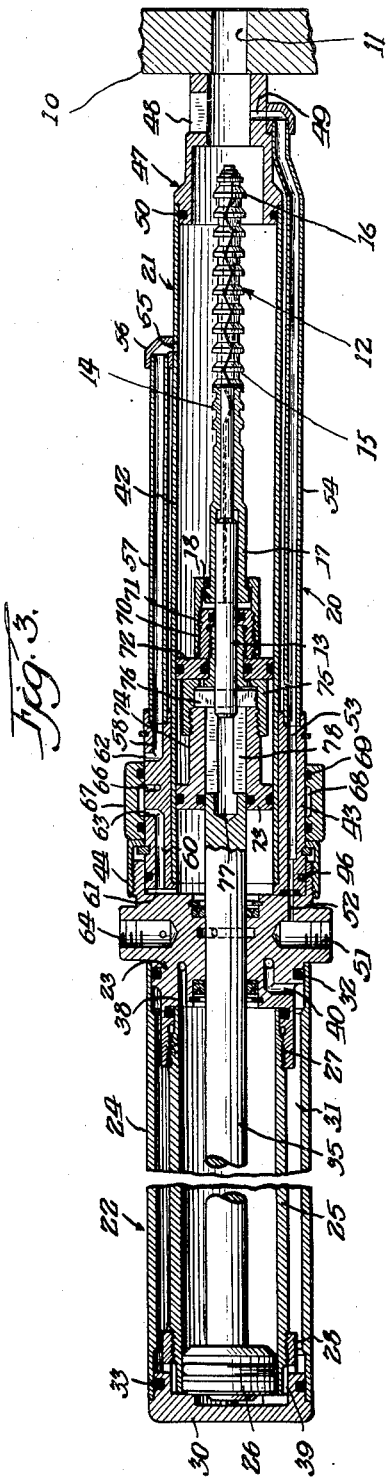
Figure 3 is a longitudinal sectional view similar to Figure 1 but showing the power cylinder in rearward position following an operation of the same for broaching a hole.

Referring more particularly to the drawings, the metal plate 10 has a hole therethrough on which a broaching operation is to be performed and accordingly the hole has been drilled several thousandths of an inch smaller than the desired finished diameter of the opening. The broaching tool 12 of the expanding type is inserted in the hole from the left side of the metal plate, the broaching tool having been inserted in contracted condtion, and upon expanding the tool, by moving the lance 13 in a forward direction relative thereto, the same is operative and ready for use. The tool essentially consists of a broaching portion 14 provided with a plurality of roughing, finishing and burnishing teeth, such as 15, and 16, the teeth 15 having the smallest diameter and the teeth 16 having the largest diameter. The said cutting teeth progressively increase in diameter from 15 to 16, whereby as the teeth are drawn through the hole 11 the same is broached in a conventional manner to the desired completed size. The opposite end of the broaching tool 12 is formed to provide a shank portion 17 and the said portion terminates in a formation providing the pulling end 18.

In order that the broaching tool may be expanded, the same is formed by associating four segmental sections, each of which approximately comprises a quarter section of the tool. Each section is joined to its adjacent section by a strip of resilient material such as rubber or the like and which has sufficient resiliency to allow the segmental sections to move radially to and from the center of the tool to effect the desired expansion and contraction. It is necessary for the rubber connecting strips to have an undulating formation since otherwise the broach would not perform a broaching operation for the full 360 degrees of its circumference. Accordingly, as a result of the wavy outline or undulating contour at the respective side edges of each segmental section, it will be understood that whereas one tooth will not broach at the rubber gaps in its circumference, the next adjacent tooth will broach since the rubber gaps therein will be angularly displaced with respect to the gaps in those teeth adjacent thereto. Thus the rubber connecting strips allow expansion of the broaching tool, which is effected after the same has been inserted in the hole, and the wavy or zig-zag formation thereof is necessary to assure full broaching action for the complete circumference of the hole.

Expansion and contraction of the segmental broach as above described is effected in a relatively simple manner by the tapered lance 13. The lance is moved forwardly for a full insertion within the broaching tool in order to expand the same, as shown in Figure 2, and for contracting the tool the lance is moved to a retracted position, such as shown in Figure 1. For a further description of the structure and more of operation of the expanding type broaching tool, reference is made to a copending application in the name of John C. Hanna, Serial No. 482,069, filed January 17, 1955 and entitled Portable Expanding Broach.

The present invention provides a portable broach pulling machine haivng means at its forward end for gripping the broaching tool and which upon operation will draw the tool through the opening whereby to perform a broaching operation thereon. In addition the broach pulling machine of the invention incorporates auxiliary piston structure having operative connection with the tapered lance by means of which the lance is moved relatively to the broaching tool for expanding and contracting the same. The machine is simple to operate and relatively light in weight since it is constructed for the most part of high strength aluminum with alloy steel being used for those members which are subject to excessive stresses.

The numeral 20 indicates the broach pulling machine in its entirety, the same including the pulling end 21, located at the right hand end of the machine, and the power cylinder end 22, located at the left hand end of the machine. The body portion 23 of the broach pulling machine is located intermediate the power cylinder end and the pulling end, and said body portion is provided with a plurality of inlet-outlet openings to be presently described in detail, by means of which an hydraulic fluid under pressure may be admitted to and exhausted from the power cylinder for operating the same, and whereby air under pressure may be admitted to and exhausted from the pulling end for effecting longitudinal movement of the lance for expanding or contracting the broach. The power cylinder end of the machine essentially consists of the outer cylinder 24, the inner cylinder 25, and the power piston 26. The inner cylinder 25 is suitably threaded to the body portion 23 as at 27 and at its opposite end the said inner cylinder 25 is threaded as at 28 to the end closure member 30. The outer cylinder 24 is confined between the body portion 23 and said end closure member 30 in a manner as clearly shown in the drawings. The outer cylinder is spaced from the inner cylinder in order to provide the annular passage 31. In order to seal the said passage packing rings are located at respective ends, the packing ring 32 being located at the right hand end of cylinder 24 in order to seal the cylinder with respect to the body portion, and in a similar manner the packing ring 33 is provided in order to seal cylinder 24 with respect to the end closure member 30.

Figure 4:
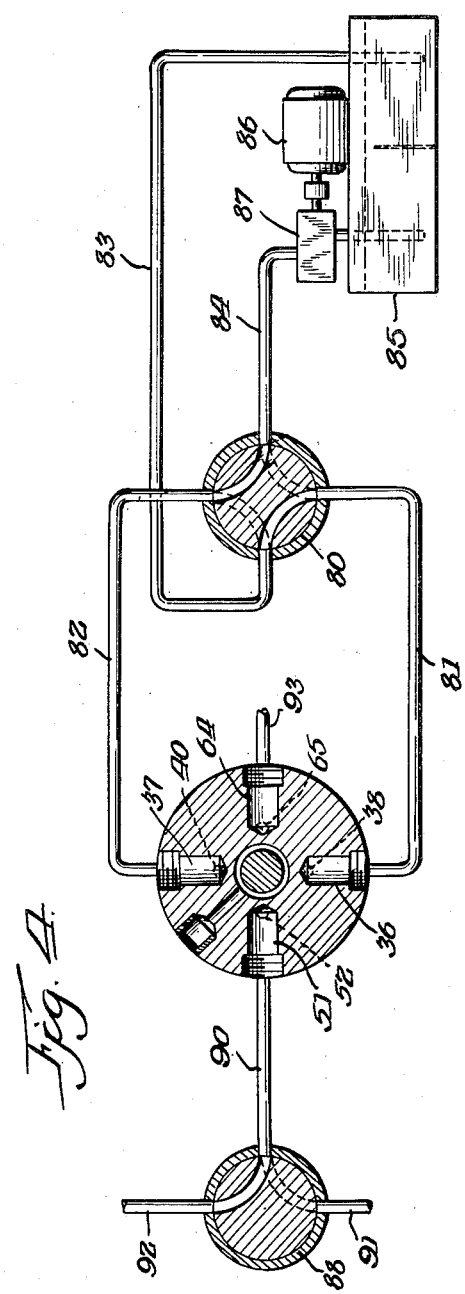
Figure 4 is a view illustrating diagrammatically certain hydraulic and pneumatic control elements for controlling the respective operations of the power cylinder and the auxiliary piston structure.

The piston rod 35 is suitably fixed to and actuated by the power piston 26, the rod extending through the body portion 23 so as to project forwardly of the body portion on the right hand side thereof. As best shown in Figure 4, inlet-outlet connections 36 and 37 are provided in the body portion 23 for admitting and exhausting pressure fluid from the respective sides of the power piston 26. When the pressure fluid is admitted to connection 36 the fluid is in turn discharged on the right hand side of the power piston 26 through the connecting passage 38. As a result the power piston will be caused to move in a direction toward the left to the rear of its cylinder 25 and in order to permit this movement the pressure fluid to the rear of the power piston will be exhausted by flow through the passage 39, the annular passage 31, and the connecting passage 40, which connects with the inlet-outlet connection 37. In order to cause movement of the power piston 26 to the right the pressure fluid is admitted to 37 in order to apply pressure to the rear of the power piston and simultaneously the connecting passage 38 is joined to the exhaust.

The pulling end of the machine includes as one of its major elements the cylinder 42 which is securely joined to the body portion 23 on the right hand side thereof by means of the extension 43 and securing collar 44. The extension is essentially a continuation of the body portion and may be formed integrally therewith or separate therefrom, although the latter is preferred in order to permit certain drilling operations to be performed thereon. The extension has a tight telescoping fit on the left hand end of the cylinder 42 and the cylinder and said extension as a unit are securely held to the body portion by the flanged securing collar 44. The packing ring 46 is provided in order to seal the joint between the body portion 23 and the said cylindrical extension.

At its forward or pulling end, the cylinder 42 is provided with the seating member 47 which is adapted to have contact with the metal plate in the vicinity of the opening to be broached during the broaching operation. The member is provided with the vent opening 48 and with the jet passage 49, and said member is securely united to the right hand end of cylinder 42 in any suitable manner, the packing ring 50 being provided for hermetically sealing the parts. Referring again to the body portion 23, it will be seen that the same has an inlet connection 51 which is joined by means of passage 52 with passage 53 extending longitudinally of the extension 43. The said passage 53 is connected by means of conduit 54 with passage 49 and thus by admitting air under pressure to inlet 51 it will be understood that the same will be exhausted at the jet opening 49 which is formed in member 47 substantially opposite the vent 48. As a result small particles of metal and the like which may accumulate within the seating member and between the same and the broach are continuously dislodged and ejected from the pulling machine.

The cylinder 42 is provided with a forward air inlet opening such as 55 extending into projection 56 and being located some distance rearwardly of the seating member 47. The conduit 57 connects projection 56 and thus the inlet 55 with the extension 43 and in particular with passage 58 formed in said extension. Another passage such as 60 is formed in the extension and this passage communicates through 61 with the rear of the cylinder 42. The opening 62 communicates with passage 58, whereas the opening 63 communicates with passage 60. The numeral 64 indicates an inlet connection provided in the body portion 23 and which is joined by the passage 65 with the air discharge opening 66 formed in the extension 43  An actuating ring or sleeve 67 is located on the extension 43 in a manner so as to have reciprocating movement with respect to the openings 62 and 63. The annular passage 68 interiorly of the actuating ring is at all times in communication with the discharge opening 66 and thus by reciprocating the ring between its two operative positions the discharge opening 66 can be connected with either 62 or 63. Accordingly, it is possible by so positioning the ring 67 to apply a pressure fluid to the forward end of cylinder 42 or to the rear end of said cylinder while simultaneously exhausting fluid from an opposite end.

When the piston rod 35 is positioned forwardly as shown in Figure 1, it extends into the seating member 47. The said forward terminal end of the piston rod is threaded at 70 for receiving the flanged retaining collar 71 which grips the end 18 of the broaching tool and thus the tool is operatively connected with the piston rod. At this forward end there is also provided an end closure piston 72 which is fixedly secured to this end of the piston rod so as to move therewith. The piston 72 is located within and is adapted to operate within the second cylinder 42.

The forward end of piston rod 35 is additionally provided with piston structure in the form of an auxiliary piston 73, having a hub 74 telescoping the piston rod and to which is threadedly secured the flanged retaining sleeve 75. By means of the key 76 the sleeve 75 connects the lance 13 to the auxiliary piston 73, the rear end of the lance having an inserted position for this purpose within the longitudinal bore 77 formed in the piston rod. In order to permit reciprocating movement of the key relative to the piston rod the said rod is diametrically slotted at 78 and the key 76 is adapted to ride in said slots.

Figure 1 shows the power piston 26 and the piston rod 35 located forwardly and with the auxiliary piston 73 in retracted position so that the lance is retracted to contract the broaching tool. This position of the parts has been effected by admitting air under pressure through opening 55 and which acts on the auxiliary piston 73 to move the same rearwardly. With the tool in contracted condition the same can be inserted through the hole to be broached until the seating member 47 engages the metal plate. To move the auxiliary piston 73 and lance 13 into a forward position for expanding the broaching tool as shown in Figure 2, it will be understood that the control element 67 is moved into its rear position in order to connect discharge opening 66 with the opening 63. Thus air under pressure is admitted to the rear of the auxiliary piston and the air located forwardly of the piston, that is, between the same and piston 72 is vented to the atmosphere. The auxiliary piston 73 is accordingly moved forward into its extreme right hand position. This extreme right hand or forward position is determined by the extent of the slots 78 which allow movement of key 76 relative to the piston rod 35. With the broaching tool in expanded condition the parts are ready for a broaching operation. Accordingly the next control movement on the part of the operator is to admit a fluid under pressure through connection 36 and passage 38 to the right side of the power piston 26, thereby driving the power piston rearwardly and drawing the broaching tool through the hole. At the completion of the broaching operation the parts will assume a position as shown in Figure 3.

The admission of air under pressure to connection 51 will result in discharging of the air at 49 and the air jet thus provided will assist in dislodging and ejecting metal particles which may be drawn into the seating member 47 by reason of the broaching operation. For additionally cleaning the metal particles from within the seating member air under pressure can be admitted through inlet opening 55. It will be observed from Figure 3 that with the power piston 26 in a rearward position the end closure piston 72 is located rearwardly beyond the inlet 55. Thus air discharging from the inlet can only flow in a forward direction through the seating member and the action of said air flow will be to blow out and eject metal particles from the seating member and from the tool.

A feature of the invention which inherently results from the structural combination as disclosed is the fact that the auxiliary piston can not be actuated into a retracted position while the power piston 26 and piston rod 34 are disposed rearwardly, as shown in Figure 3. Accordingly, the next control action on the part of the operator is to effect forward movement of the power piston 26 and piston rod 35, and when this has taken place the discharge of air under pressure from inlet opening 55 will be in the space between the end closure piston 72 and the auxiliary piston 73. Presently sufficient pressure will build up within said space as to effect rearward movement of the auxiliary piston 73 so that the lance is withdrawn from the broaching tool and the parts assume the position of Figure 1, with the broaching tool in contracted condition ready to be inserted in another opening for another broaching operation thereon.

The present broaching machine draws the tool through the opening to be broached in a conventional manner, for which purpose power cylinder 25 and power piston 26 are employed and which when properly operated produce the desired reciprocating movements of the piston rod and broaching tool. Since the broaching tool is of the expanding type, expansion and contraction of the same must be effected alternately with respect to the operations of inserting the contracted tool in the opening and drawing of the expanded tool back through the opening. The major advantage of the expanding type of broaching tool is that it permits all operations of broaching to be performed from the same side of the metal plate.

It is possible to control the several operations of the broaching tool by actuation of control elements such as schematically illustrated in Figure 4. The valve member 80 has two operative positions for controlling movement of the power piston 26. The conduits 81 and 82 lead from the valve member and connect the same with the connections 36 and 37, respectively. In a similar manner the conduits 83 and 84 connect the valve member with the fluid reservoir 85 and pumping instrumentalities, respectively, the latter consisting of the electric motor 86 and the hydraulic pump 87. With the valve positioned as shown in Figure 4, an hydraulic fluid such as oil under pressure is admitted to connection 37, whereupon the same will flow through passage 40, passage 31, and passages 39, to be admitted to the rear of power piston 26. Thus the power piston will assume a position as shown in Figure 1. In order to move the power piston rearwardly the valve 80 is moved into its second operative position, which will admit an hydraulic fluid under pressure to connection 36. The said fluid will flow through passage 38 to be admitted forwardly of the power piston 26 so as to drive the power piston in a rearward direction. As a result thereof the parts will be located as shown in Figure 3. The air jet 49 is periodically supplied with air under pressure by means of the valve member 88 having connection through the conduit 90 with the connection 51 of the body member 23. The inlet conduit 91 for delivering air under pressure also has connection with valve 88 and diametrically opposite thereto the exhaust conduit 92 connects with said valve. Depending on the position of valve 88 air under pressure can be supplied to conduit 90, or conduit 90 can be connected with the exhaust. The air line conduit 93 supplies air under pressure to connection 64 which in turn is delivered to passage 65 for discharge through opening 66. From said opening the flow of this air is controlled by the movable ring or sleeve 67. When the ring is located forwardly it connects 66 with opening 62 and air is supplied to the second cylinder 42 for retracting the lance 13. When ring 67 is positioned rearwardly, opening 66 is connected with opening 63 and air under pressure is admitted to the rear of piston 73 for moving the lance forwardly. The auxiliary piston structure, which may be considered as including the end closure piston 72, the auxiliary piston 73, and hub member 74, are all carried by the piston rod 35 and the parts have movement as a unit with the piston rod. However, the auxiliary piston 73 may reciprocate independently of the piston rod to move the key and thus the lance 13, as permitted by the slots 78.

What is claimed is:
1. A broach pulling machine, in combination, a body portion, a power cylinder secured to the body portion on the rear side thereof, a piston operating within the power cylinder and having a piston rod extending through the body portion to project forwardly thereof, a second power cylinder secured to the body portion on the front side thereof and having association with the piston rod whereby the piston rod is disposed centrally within the second power cylinder and has movement longitudinally with respect thereto, a second piston secured to the forward end of the piston rod, means located forwardly of the second piston for securely attaching the shank end of a broaching tool to the piston rod, a lance adapted to have longitudinal movement within the broaching tool for effecting expansion and contraction of the same, auxiliary piston structure carried by the piston rod rearwardly of the second piston and within the second power cylinder, said auxiliary piston structure being mounted on the piston rod for movement with the piston rod and for movement relative thereto, means connecting the said auxiliary piston structure with the lance, a control element for alternately admitting to and exhausting a pressure fluid from the respective ends of the first mentioned power cylinder, and a second control element for alternately admitting to and exhausting a pressure fluid from the respective ends of the second power cylinder.

2. In a broach pulling machine, in combination, a body portion providing a power cylinder disposed on the rear side thereof, a piston operating within the power cylinder and having a piston rod extending through the body portion to project forwardly thereof, a second cylinder fixed to the body portion on the forward side and having spaced telescoping relation with the projecting portion of the piston rod, means at the forward end of the piston rod for gripping the shank end of a broaching tool, a lance adapted to have longitudinal movement within the broaching tool for effecting expansion and contraction of the same, the rear end of said lance extending within a longitudinal bore formed in the forward end of the piston rod, said forward end of the piston rod having a slot therein, a key fixed to the rear end of the lance and adapted to ride in the slot, auxiliary piston structure carried at the forward end of the piston rod and adapted to have limited reciprocating movement with respect to the rod, and means connecting the auxiliary piston structure with the key.

3. In a broach pulling machine, in combination, a body portion providing a power cylinder disposed on the rear side thereof, a piston operating within the power cylinder and having a piston rod extending through the body portion to project forwardly thereof, a second cylinder fixed to the body portion on the forward side and having spaced telescoping relation with the projecting portion of the piston rod, means at the forward end of the piston rod for gripping the shank end of a broaching tool, a second piston secured to the forward end of the piston rod adjacent the connection therewith of the broaching tool, said second piston having location within and being adapted to operate within the second cylinder, a lance adapted to have longitudinal movement within the broaching tool for effecting expansion and contraction of the same, the rear end of said lance having location within a longitudinal bore formed in the forward end of the piston rod and extending rearwardly of the second piston, said forward end of the piston rod having a slot therein for approximately the length of the bore, a key fixed to the rear end of the lance and adapted to ride in the slot, auxiliary piston structure mounted on the forward end of the piston rod and adapted to reciprocate relatively to the rod, and means connecting the auxiliary piston structure with the key.

4. A broach pulling machine as defined by claim 3, additionally including a control element for alternately admitting to and exhausting a pressure fluid from the respective ends of the first mentioned power cylinder, and a second control element for alternately admitting to and exhausting a pressure fluid from the respective ends of the second power cylinder.

5. In a broach pulling machine for an expanding type of broaching tool, in combination, a power cylinder providing a power piston operating therein and a piston rod fixed to the power piston and projecting forwardly thereof, said piston rod reciprocating between a forward and a rear position upon operation of the power piston, an expanding type broaching tool fixed to the forward terminal end of the piston rod, a lance adapted to have longitudinal movement within the broaching tool for effecting expansion and contraction of the same, a second cylinder in associated relation with said piston rod, a second piston secured to the forward end of the piston rod adjacent the connection therewith of the broaching tool, said second piston having location within the second cylinder for movement therein upon movement of the piston rod, the rear end of the lance having location within the second cylinder for movement therein upon movement of the piston rod, the rear end of the lance having location within a longitudinal bore in the forward end of the piston rod and which extends rearwardly of the second piston, said piston rod having a slot therein communicating with and extending approximately the length of the bore, auxiliary piston structure mounted on the piston rod rearwardly of the slot therein and being adapted to reciprocate relatively to the piston rod, and means riding in the slot for connecting the auxiliary piston structure with the lance.

References Cited in the file of this patent
UNITED STATES PATENTS

| | | |
|---|---|---|
| 1,846,014 | Bogart | Feb. 23, 1932 |
| 2,386,837 | Bonnafe | Oct. 16, 1945 |
| 2,419,657 | Roberts | Apr. 29, 1947 |
| 2,770,174 | Hammill | Nov. 13, 1956 |